June 13, 1961  F. HARTWIG  2,988,588
CONTACT ARRANGEMENT
Filed Feb. 24, 1959  2 Sheets-Sheet 1

*Inventor:*
FRITZ HARTWIG
By Toulmin & Toulmin
Attorneys

June 13, 1961 F. HARTWIG 2,988,588
CONTACT ARRANGEMENT
Filed Feb. 24, 1959 2 Sheets-Sheet 2

Inventor:
FRITZ HARTWIG
By Toulmin & Toulmin
Attorneys

United States Patent Office 2,988,588
Patented June 13, 1961

2,988,588
CONTACT ARRANGEMENT
Fritz Hartwig, Oldenburg, Germany, assignor to Licentia Patent-Verwaltungs-G.m.b.H., Hamburg, Germany
Filed Feb. 24, 1959, Ser. No. 794,983
Claims priority, application Germany May 2, 1958
2 Claims. (Cl. 136—135)

The present invention relates to a contact arrangement.

More particularly, the present invention relates to a contact arrangement for electrically connecting to each other two components which can be mechanically connected to each other in a plurality of positions, in such a manner that irrespective of which of these positions the components occupy, they will be electrically connected to each other with the same polarity.

There are many different types of apparatuses and constructions in which two electrical components must be connected to each other with proper polarity. Nevertheless, the physical arrangement of the components is often such that they may be connected to each other in more than one position. An example of such an apparatus would be a charging device which is adapted to receive a small accumulator or battery, which device can then be connected to a suitable external source of electric energy so that the battery may be charged. In such an apparatus, the shape of the battery and that of the space of the charging device into which the battery is inserted will usually be more or less complementary to each other so that there is already a limit to the number of positions which the battery may occupy relative to the charging device. However, the cylindrical or block-shape of the battery will allow the battery to be inserted in at least two different positions, so that it is possible inadvertently to insert the battery in such a manner that its positive and negative terminals will not necessarily be in electrical engagement with the corresponding positive and negative terminals of the charging device. The resulting polarity error which may thus arise will either ruin the battery or at least prevent it from being charged.

Various attempts have been made to overcome the above disadvantages. According to one method, the battery and charging device are provided with visible indicia means which indicate how the battery should be inserted, and according to another method the battery and charging device are formed with complementary noses and grooves or the like. In the first-mentioned case, there is no assurance that the user will heed the visual indicia means, and in the latter case there is the need to equip not only the charging device but each and every battery which is to be charged with suitable noses and/or grooves. This is not only a prohibitively expensive solution, but also, there is the ever-present danger of damage to the noses, so that there is no assurance that the batteries will be inserted in proper position. Furthermore, there is the problem of providing suitable tolerances, which is particularly important in the case of disk-shaped or cylindrically shaped batteries the end faces of which serve as contact surfaces, because the distance between the opposite end faces is dependent to some extent upon the condition of charge of the battery.

It is therefore an object of the present invention to provide a contact arrangement which overcomes the above disadvantages.

It is another object of the present invention to provide a contact arrangement which does not require either of the two electrical components which are to be coupled to each other with proper polarity to be equipped with visual or mechanical means which would limit their being coupled in but one position.

It is yet another object of the present invention to provide a contact arrangement which is of simple construction.

The objects of the present invention also include the provision of a contact arrangement which can be used in conjunction with existing electrical components, particularly electrical batteries.

With the above objects in view, the present invention mainly resides in a contact arrangement for electrically connecting to each other two components which can be mechanically connected to each other in a plurality of positions, in such a manner that irrespective of which of these positions the components occupy, they will be electrically connected to each other with the same polarity. If there are two such positions, the contact arrangement comprises a contact of one polarity and a contact of the opposite polarity on one of the components, and contact means of the one polarity and a pair of contacts of the opposite polarity on the other of the components. The contacts and contact means are so arranged that when the components are in one of their positions, the contact of the one polarity of the one component is in electrical engagement with the contact means of the other component and the contact of the opposite polarity of the one component is in electrical engagement with one of the pair of contacts of the components, and that when the components are in the other of their positions, the contact of one polarity of the one component is in electrical engagement with the contact means of the other component and the contact of the opposite polarity of the one component is in electrical engagement with the other of the pair of contacts of the other component.

Additional objects and advantages of the present invention will become apparent upon consideration of the following specification when taken in conjunction with the accompanying drawings in which.

Figure 1:
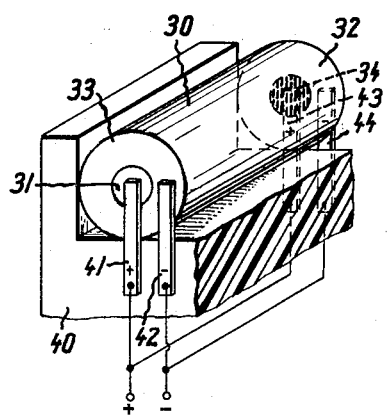
FIG. 1 is a diagrammatic representation of a cylindrical battery and receiving component combination incorporating a contact arrangement according to the present invention, the battery being shown in one of its two positions.
Figure 2:
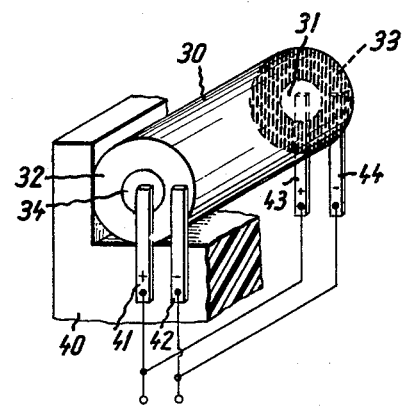
FIG. 2 is a diagrammatic representation of the same structure as shown in FIG. 1, except that the battery is shown in the other of its two positions.

Referring now to the drawings and to FIGS. 1 and 2 thereof in particular, there are shown two electrical components 30 and 40 which are to be electrically connected to each other without polarity error. The component 30 is depicted as a cylindrical battery the opposite end faces 31 and 32 of which form positive and negative terminals, respectively. The end face 31 carries an insulating ring 33 which leaves the central portion of the end face 31 exposed and the end face 32 carries an insulating disk which leaves an annular portion of the end face 32 exposed. The outer diameter of the insulating disk 34 and the inner diameter of the insulating ring 33 are substantially equal to each other.

The component 40 is shown as a receiving component adapted to receive the battery either in the position shown in FIG. 1 or in the position shown in FIG. 2. The receiving component has a pair of electrically connected positive contacts 41 and 42 and a pair of electrically connected negative contacts 43 and 44. These contacts are so located that when the battery occupies the position illustrated in FIG. 1, the positive battery contact 31 is in electrical engagement with the positive receiving component contact 41 and the negative battery contact 32 is in electrical engagement with the negative receiving component contact 42. Electrical engagement between the contacts 31 and 42 and between the contacts 32 and 43 is prevented by the insulating ring 33 and the insulating disk 34, respectively. However, when the battery occupies the position shown in FIG. 2, the positive battery contact 31 engages the positive receiving component contact 43 and the negative battery contact 32 engages the negative receiving component contact 42, the insulating ring 33 and insulating disk 34 again preventing electrical engagement between contacts of different polarities.

It will be seen from the above that irrespective of the position in which the battery 30 is inserted into the receiving component 40, the two will be electrically connected to each other with the same polarity.

Figure 3:
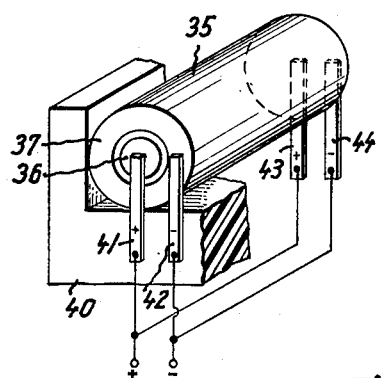
FIG. 3 is a diagrammatic representation of a structure similar to that shown in FIGS. 1 and 2 except for the arrangement of the contacts on the battery.

The receiving component 40 may also be used in conjunction with a battery 35, shown in FIG. 3, which has both of its contacts on the same end face. The positive terminal 36 is arranged in the center of the end face and the negative terminal 37 is an annular one arranged at the periphery of the battery. Since both of the positive receiving component contacts 41 and 43 will engage the central portions of the end faces of the battery, and since both of the negative receiving component contacts 42 and 44 will engage portions of the respective end faces which are radially spaced from the respective central portions the same distance which the annular contact 37 of the battery is radially spaced from the central contact 36, the battery 35 and component 40 will be electrically connected to each with the same polarity irrespective of whether the battery occupies the position shown in FIG. 3, or a position in which the contacts 36, 37 engage the contacts 43, 44, respectively.

Figure 4:
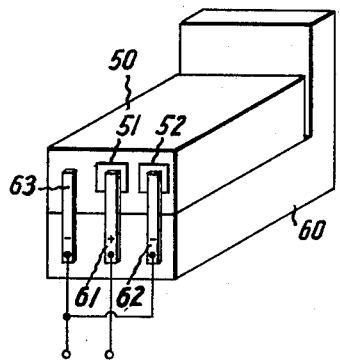
FIG. 4 is a diagrammatic representation of a block-shaped battery and receiving component combination incorporating a contact arrangement according to the present invention, the battery being shown in one of its two positions.
Figure 5:
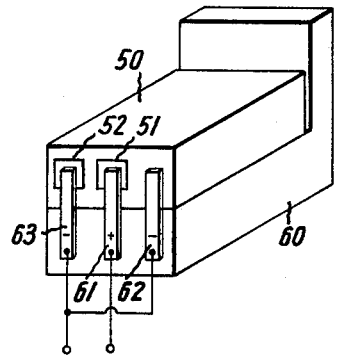
FIG. 5 is a diagrammatic representation of the same structure as shown in FIG. 4 except that the battery is shown in the other of its two positions.

FIGS. 4 and 5 show a contact arrangement in which a block-shaped battery 50 is adapted to be inserted into a receiving component 60 in either of the two positions shown in these figures. The battery 50 has both its positive contact 51 and its negative contact 52 on the same end face, the former being arranged substantially in the center of the end face and the latter being spaced from the center. The receiving component has a positive contact 61 which engages the positive battery contact 51 irrespective of the position of the battery, and two electrically connected negative contacts 62 and 63. The latter are so positioned as to engage portions of the battery end face which are spaced from the central portion and which are diametrically opposite each other, the arrangement of the parts being such that the negative battery contact 52 will engage either the negative receiving component contact 62 (FIG. 4) or the negative receiving component contact 63 (FIG. 5). Thus, the battery 50 and receiving component 60 will be electrically connected to each other with the same polarity irrespective of the position of the battery 50 within the receiving component 60.

Figure 9:
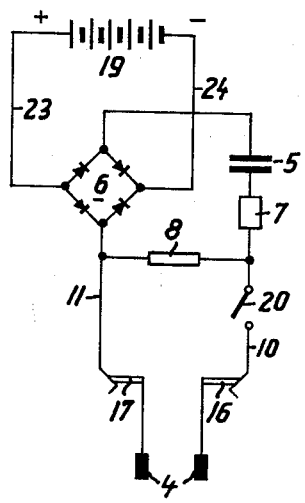
FIG. 9 is a schematic diagram of the charging device and battery.
Figure 6:
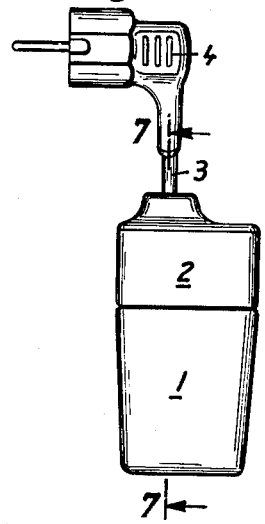
FIG. 6 is a side view of a charging device constituting a receiving component adapted to receive a battery to be charged, the charging device and battery being equipped with a contact arrangement according to the present invention.

FIGS. 6 and 9 show a construction in which the receiving component is constituted by a charging device adapted to receive the battery, which charging device is itself adapted to be plugged into an electrical outlet so that the battery may be charged from an external source of electrical energy, as, for example, an alternating current source.

Figure 7:
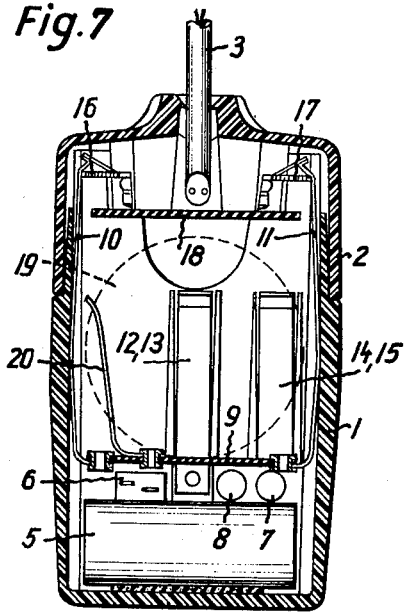
FIG. 7 is a sectional view of the charging device taken substantially along line 7—7 of FIG. 6.
Figure 8:
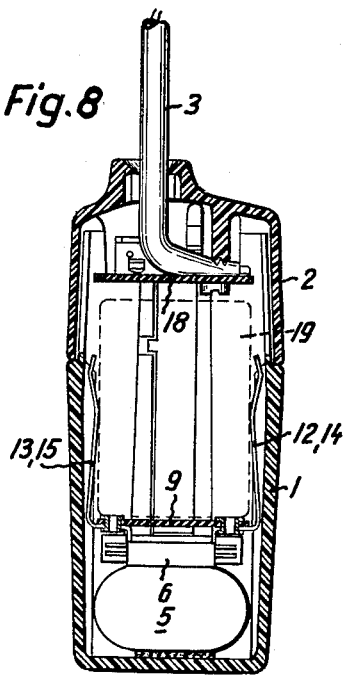
FIG. 8 is a sectional view of the charging device in a plane forming an angle of 90° with the plane of FIG. 7.

FIGS. 6 to 8 show the charging device as being substantially block-shaped, and as comprising a container 1 and a cover 2. The container holds the battery as well as the electrical components which make up the charging circuit, and the cover carries the electric cord, the free end of which is attached to a two-pring male plug adapted to be plugged into an ordinary electric outlet (not shown).

The components which comprise the charging circuit are the capacitor 5, the rectifier 6 and the resistors 7 and 8, all of which are arranged at the bottom of the container 1. An insulating plate 9 is provided for closing off the compartment within which the charging circuit components are located, and this plate carries the lead-in leaf springs 10, 11 and the leaf spring contacts 12, 13, 14 and 15, the latter being arranged in substantially the same manner as the contacts 41, 42, 43 and 44 of the receiving component 40, shown in above-described FIGS. 1 to 3.

The cover 2 also carries the terminal posts 16, 17 to which the wires of the cord 3 are connected. These terminal posts are closed off by an insulating plate 18.

The battery 19 is shown in FIGS. 7 and 8 in dotted lines, and, depending upon the arrangement of the positive and negative terminals on the battery, it cooperates with the contacts 12, 13, 14 and 15 in the same manner as the battery 30 or the battery 35 cooperates with the contacts 41, 42, 43 and 44 so that irrespective of the position in which the battery 19 is inserted into the charging device, the battery and charging device will be electrically connected to each other with the same polarity.

The battery also cooperates with a leaf spring 20 which upon insertion of the battery into the container 1 is cammed into engagement with the lead-in leaf spring 10, so that the charging circuit is not closed unless there is a battery present in the container.

FIG. 9 is a schematic diagram of the charging circuit and the battery, from which it will be seen that when the prongs of the plug 4 are plugged into an electric outlet socket which is connected to a source of alternating current, and when the switch constituted by the leaf spring 20 is closed due to the presence of a battery, the latter will be charged.

It will be understood that the present invention is susceptible to modifications in order to adapt it to different usages and conditions. For example, the contact arrangement allowing two components to be electrically connected to each other with the same polarity irrespective of which of a plurality of different physical or mechanical positions the two components occupy, may be used in apparatuses and structures other than a battery charging device. Thus, the contact arrangement may find use in a wide variety of battery-operated devices, such as electrically powered dry shavers, or in any other type of electrical combination in which two components which can be mechanically coupled to ecah other in more than one physical position, must always be electrically connected with the same polarity. Accordingly, it is desired to comprehend such modifications within this invention as may fall within the scope of the appended claims.

What is claimed is:

1. In an apparatus for batteries, the combination comprising: a support of insulating material; a first pair of upstanding contact arms secured to said support; a second pair of upstanding contact arms also secured to said support and spaced from said first pair by a distance substantially equal to the length of a battery to be inserted therebetween, opposite contact arms of said pairs having the same polarity, the contact faces of each pair of contact arms being substantially coplanar; an elongated battery with one end thereof forming a terminal of one polarity and the opposite end thereof forming a terminal of the other polarity, said pairs of contact arms being asymmetrically arranged with respect to the center axis of said elongated battery; an annular insulating ring on one end of said battery; and an insulating disk on the center of the other end of said battery protruding from the terminal at that end thereof, said battery being positioned between the said opposite pairs of contact arms, one contact arm of each pair contacting the respective battery end and the other contact arm pertaining to the same pair contacting only the insulating material on the same battery end.

2. In an apparatus for batteries as set forth in claim 1, wherein one contact arm of one pair and the opposite contact arm of the other pair are located along the center axis of the battery and the other opposite contact arms being arranged laterally of the center axis of the battery when the battery is in position therebetween.

References Cited in the file of this patent

UNITED STATES PATENTS

| | | |
|---|---|---|
| 1,879,595 | Voorhees | Sept. 27, 1932 |
| 1,879,623 | Jones | Sept. 27, 1932 |
| 2,293,354 | Munchow | Aug. 18, 1942 |
| 2,780,766 | Hedding | Feb. 5, 1957 |